United States Patent
Pappas et al.

(10) Patent No.: US 8,982,888 B2
(45) Date of Patent: Mar. 17, 2015

(54) SERVICE DATA FLOW DETECTION IN A CONFORMING 3GPP ACCESS NETWORK HAVING A PACKET MODIFICATION FUNCTION

(75) Inventors: Scott J. Pappas, Lake Zurich, IL (US); Anatoly Agulnik, Deerfield, IL (US); Robert A. Fredericks, Carol Stream, IL (US); James A. Marocchi, Winfield, IL (US); Trent J. Miller, West Chicago, IL (US); James M. Nowakowski, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 625 days.

(21) Appl. No.: 12/906,226

(22) Filed: Oct. 18, 2010

(65) Prior Publication Data

US 2012/0092992 A1 Apr. 19, 2012

(51) Int. Cl.
*H04L 12/56* (2011.01)
*H04W 28/02* (2009.01)
(Continued)

(52) U.S. Cl.
CPC ....... *H04W 28/0263* (2013.01); *H04L 47/2491* (2013.01); *H04W 28/10* (2013.01)
USPC ........... 370/392; 370/328; 370/349; 370/389; 370/474; 455/422.1; 709/236

(58) Field of Classification Search
USPC .............. 370/310.2, 328–339, 349, 389, 392, 370/474; 455/422.1; 709/231, 236
See application file for complete search history.

(56) References Cited

U.S. PATENT DOCUMENTS

| 4,554,522 A | 11/1985 | Minks |
| 7,414,970 B2 | 8/2008 | Towle |
| 7,843,876 B2 | 11/2010 | Holt et al. |

(Continued)

FOREIGN PATENT DOCUMENTS

| EP | 1976196 A1 | 10/2008 |
| WO | 2007079773 A1 | 7/2007 |
| WO | 2010112077 A1 | 10/2010 |

OTHER PUBLICATIONS

3GPP TS 23.203 V9.3.0 (Dec. 2009); 3rd Generation Partnership Project; Technical Specification Group Services and System Aspects; Policy and charging control architecture (Release 9); Dec. 2009.

(Continued)

*Primary Examiner* — Hoon J Chung
(74) *Attorney, Agent, or Firm* — Steven May

(57) ABSTRACT

A system includes: a packet processing function and a packet modification function. The packet processing function receives a packet generated by a sending application function and destined for a receiving application function. The packet includes first identifier information, and the packet processing function adds second identifier information thereto. The packet modification function: receives the packet; alters it in a way that prevents use of the first identifier information by a 3GPP conforming service data flow detection process to map the packet to a first service data flow for the sending application function; and provides the packet to a packet routing function with the second identifier information positioned in the packet to enable the packet routing function to use the second identifier information in the 3GPP conforming service data flow detection process to map the packet to the first service data flow and to a bearer for transporting the packet.

19 Claims, 3 Drawing Sheets

(51) Int. Cl.
  *H04L 12/857* (2013.01)
  *H04W 28/10* (2009.01)

(56) References Cited

U.S. PATENT DOCUMENTS

| | | | |
|---|---|---|---|
| 7,957,738 B2 | 6/2011 | Rey et al. | |
| 2003/0012139 A1* | 1/2003 | Fukumoto et al. | 370/235 |
| 2005/0265335 A1 | 12/2005 | Ramanath et al. | |
| 2009/0300207 A1* | 12/2009 | Giaretta et al. | 709/232 |
| 2012/0121262 A1 | 5/2012 | Andriolli et al. | |
| 2012/0213072 A1 | 8/2012 | Kotecha et al. | |
| 2012/0263119 A1 | 10/2012 | Monogioudis | |
| 2013/0121262 A1 | 5/2013 | Sadiq et al. | |
| 2014/0105017 A1 | 4/2014 | Scott et al. | |

OTHER PUBLICATIONS

International Search Report and Written Opinion for International Application No. PCT/US2011/053350 mailed on Dec. 23, 2011.
"Digital Cellular Telecommunications System (Phase 2+); Universal Mobile Telecommunications System (UMTS); LTE; Policy and Charging Control Architecture (3GPP TS 123.203 version 9.6.0 Release 9)," Technical Specification, European Telecommunications Standards Institute, vol. 3GPP SA 2, No. V9.6.0, Oct. 1, 2010.
International Search Report for related International Application No. PCT/US2012/062584 mailed on Apr. 3, 2013.
Non Final Office Action mailed on Jul. 19, 2013 in related U.S. Appl. No. 13/296,971, Rummana S. Sadiq, filed Nov. 15, 2011.
Ekstrom, H., "QoS control in the 3GPP evolved packet system," IEEE Communications Magazine, vol. 47, No. 2, Feb. 1, 2009, pp. 76-83.
Li Li et al., "End-to End QoS performance management across LTE networks," Network Operations and Management Symposium, 2011, 13th Asia-Pacific, IEEE, Sep. 21, 2011, pp. 1-4.
3GPP TS 23.203 V10.1.0 (Release 10) Sep. 2010; 3rd Generation Partnership Project; Technical Specification Group Services and System Aspects; Policy and charging control architecture, pp. 1-132.
Notice of Allowance mailed May 15, 2014, in U.S. Appl. No. 13/296,971, Rummana S. Sadiq et al., filed Nov. 15, 2011.
Patent Examination Report No. 1 mailed Jun. 25, 2014 in corresponding Australian Patent Application No. 2011318503.
Notice of Allowance mailed Aug. 7, 2014, in U.S. Appl. No. 13/296,971, Rummana S. Sadiq et al., filed Nov. 15, 2011.
Notice of Acceptance mailed Sep. 10, 2014 in corresponding Australian Patent Application No. 2011318503.

* cited by examiner

US 8,982,888 B2

SERVICE DATA FLOW DETECTION IN A CONFORMING 3GPP ACCESS NETWORK HAVING A PACKET MODIFICATION FUNCTION

TECHNICAL FIELD

The technical field relates generally to 3GPP communication systems and more particularly to a method and system for service data flow detection in a conforming 3GPP access network that includes a packet modification function.

BACKGROUND

Many major carriers in the United States (US) and several worldwide carriers are converting or have already converted their networks to conforming $3^{rd}$ Generation Partnership Program (3GPP) access networks, such as Long Term Evolution (LTE) networks. As the term is used herein, a conforming 3GPP access network is a network having elements (both infrastructure and subscriber elements) whose operation conform with a suite of 3GPP Technical Specifications (TSs), with the most recent versions of the 3GPP TSs being published in June 2010 as a revised "Release 9" and in September 2010 as "Release 10".

Conforming 3GPP access networks are further defined or characterized by network elements that make up an Evolved Packet Core (EPC), which provides for a flat IP-based network architecture designed to ensure support for, and mobility between, some legacy or non-3GPP systems such as, for instance, GPRS (general packet radio service) and WiMAX (Worldwide Interoperability for Microwave Access). Some of the main advantages of the EPC architecture are high throughput, low latency, plug and play, FDD (frequency-division duplexing) and TDD (time-division duplexing) in the same platform, improved end user experience, simple architecture resulting in low operating costs, and interoperability with older standard wireless technologies such as GSM (Global Systems for Mobile Communications), cdma-One™, W-CDMA (UMTS), and CDMA2000®.

When data packets are sent end-to-end between, for instance, a sending application function and a receiving application function client over the conforming 3GPP access network, one of the functions of the EPC (and the subscriber device) is to map the data packets to a service data flow (i.e., service data flow detection) and, thereby, to map the packets to a bearer having desired Quality of Service (QoS) attributes to transport the packets over a wireless over-the-air interface. A problem arises however, when the network also includes a packet modification function in the communication path of the data packets. The packet modification function disrupts this service data flow detection process and, thereby, prevents the selection of the appropriate bearer for sending the packets.

Thus, there exists a need for a technique for service data flow detection in a conforming 3GPP access network having a packet modification function.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
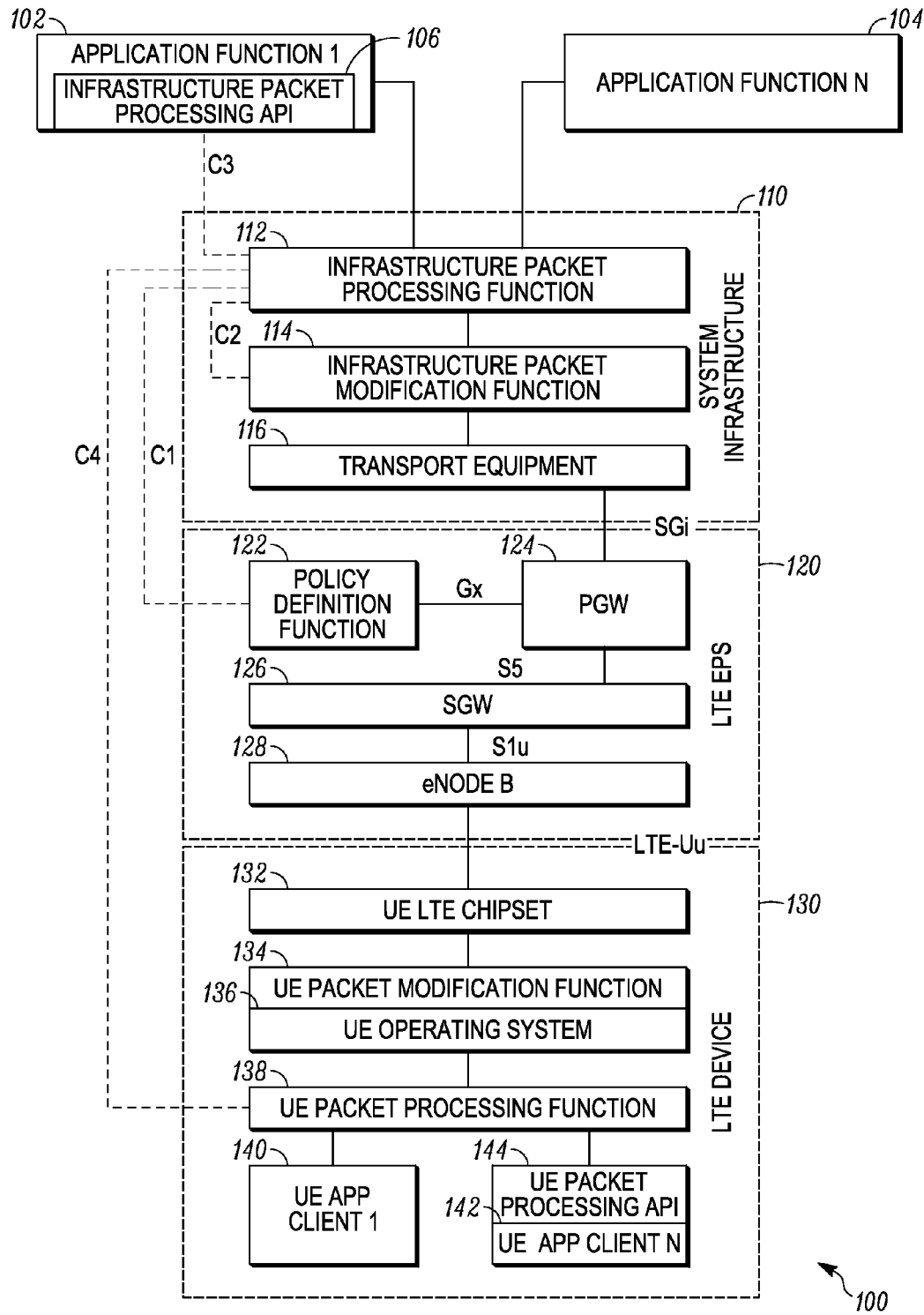
FIG. 1 is a functional block diagram illustrating a conforming 3GPP access network that includes a packet modification function and that implements service data flow detection in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a system includes a packet processing function and a packet modification function. The packet processing function receives a packet generated by a sending application function, wherein the packet is destined for a receiving application function and wherein the packet includes first identifier information, and the packet processing function adds second identifier information to the packet. The packet modification function: receives the packet from the packet processing function; alters the packet in a way that prevents use of the first identifier information by a 3GPP conforming service data flow detection process to map the packet to a first service data flow for the sending application function; and provides the packet to a packet routing function with the second identifier information positioned in the packet to enable the packet routing function to use the second identifier information instead of the first identifier information in the 3GPP conforming service data flow detection process to map the packet to the first service data flow and to a bearer used to send the packet to the receiving application function. Those skilled in the art will realize that the above recognized advantages and other advantages described herein are merely illustrative and are not meant to be a complete rendering of all of the advantages of the various embodiments.

Referring now to the drawings, and in particular FIG. 1, a functional block diagram illustrating a conforming 3GPP access network that includes a packet modification function and that implements service data flow detection in accordance with some embodiments is shown and indicated generally at 100. Network 100 includes infrastructure application functions (AFs) 102 and 104, system infrastructure elements 110, an LTE Evolved Packet System (EPS) 120, and an LTE device or user equipment (UE) 130. As will be explained in further detail below, in this illustrative LTE implementation, the system infrastructure 110 and the UE 130 both include packet modification functions, which in this example are virtual private network (VPN) functions, which encrypt and encapsulate packets coming from the respective applications functions in such a way that a packet data network gateway (PGW) in the LTE EPS 120 cannot use first identifier information in the packets to correct apply QoS policy to the packets. Therefore, in accordance with the teachings herein, a packet processing function is added to the system infrastructure 110 and the UE 130 to intercept the packets and add second identifier information to the packet before sending it to the VPN function, and the second identifier information is used by the PGW to apply QoS policy to the packets. The packet processing function receives this second identifier information from an enhanced Policy and Charging Rules Function in the LTE EPS 120.

LTE is specifically referred to herein as being illustrative of elements within a conforming 3GPP access network, but those skilled in the art, however, will recognize and appreciate that the specifics of this example are merely illustrative of some embodiments and that the teachings set forth herein are applicable in a variety of alternative settings. For example, since the teachings described do not depend on the elements being LTE, they can be applied to any type of conforming 3GPP access network although an LTE implementation is shown in this embodiment. As such, other alternative implementations of using different types of conforming 3GPP access network elements are contemplated and are within the scope of the various teachings described. Moreover, only two infrastructure AFs, one system infrastructure element, one set of LTE EPS elements, and one LTE UE is shown, additional of such elements are likely to be included in a commercial or private network implementation. Also, an eNodeB 128 (illustrated therein) can be included any type of access network, including any 2G, e.g., Global System for Mobile Communication (GSM) or 3G, e.g., Universal Mobile Telecommunications System (UMTS), access network.

At least one of the AF 102, 104 (in this case AF 102) includes an infrastructure packet processing application programming interface (API). The system infrastructure 110 includes an infrastructure packet processing function 112, an infrastructure packet modification function 114, and a transport element 116. The LTE EPS 120 includes a policy definition function (PDF) 122 (e.g., an enhanced Policy and Charging Rules Function (PCRF)), a packet routing function 124 (e.g., a packet data network gateway (PGW)), a serving gateway (SGW) 126, and the eNodeB 128. The UE device 130 includes a UE LTE chipset 132, a UE packet modification function 134, a UE operating system 136, a UE packet processing function 138, and UE AFs 140 and 142 (also referred to in the drawings and known in the art as UE application ("app") clients and also referred to herein, interchangeably, as AF clients in the UE), wherein at least one of the UE AF clients (in this case UE AF 142) includes a UE packet processing API 144. The elements of access network 100 and the interfaces (e.g., C1, C2, C3, C4, SGi, Gx, S5, S1u, and LTE-Uu) between these elements are further described below.

As part of a conforming 3GPP access network, this means that the AFs 102, 104, LTE EPS 120 elements, and LTE UE device 130 elements implement protocols and signaling in accordance with 3GPP TSs; and the terms LTE communication system, LTE system, and Evolved Packet System (EPS) are used interchangeably herein and are each defined as being inclusive of a radio access network (comprises the eNodeB 128) and an evolved packet core (which includes the enhanced PCRF 122, the PGW 124, and the SGW 128) but not inclusive of the AFs 102, 104, the system infrastructure 110, or the UE 130. By contrast, the AFs 102, 104 may reside, for example, on an application server, wherein both the application server and the system infrastructures 110 are included in a network of a service provider for the UE 130, and communications between the AFs 102, 104 and the AF clients 140, 142 are facilitated using the system infrastructure 110 and the LTE EPS 120.

In general, the UE 130, AFs 102 and 104, the system infrastructure elements 110, and the LTE EPS 120 elements are each implemented using (although not shown) a memory, one or more interfaces, and a processing device that are operatively coupled, and which when programmed form the means for these network elements to implement their desired functionality, for example as illustrated by reference to the methods flow diagrams shown in FIG. 2 and FIG. 3. The interfaces may be network interfaces that are used for passing signaling, also referred to herein as messaging, (e.g., messages, packets, datagrams, frames, superframes, and the like) between the elements of the network 100. The implementation of the network interface in any particular element depends on the particular type of network, i.e., wired and/or wireless, to which the element is connected. The interfaces can also include component interfaces which include interfaces for passing signaling between components within the same device or can include interfaces for passing messaging between different devices (e.g., reference points C1, C2, C3, C4, SGi, Gx, S5, S1u, and LTE-Uu).

Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing device utilized by the UE 130, AFs 102 and 104, the system infrastructure elements 110, and the LTE EPS 120 elements may be programmed with software or firmware logic or code for performing functionality described by reference to FIG. 2 and FIG. 3; and/or the processing device may be implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

We now turn to a brief description of the functionality of the network elements shown in FIG. 1, which will aid in the understanding of the later description of the methods illustrated in FIG. 2 and FIG. 3. AFs 102 and 104 (and AF clients 140 and 142) are each elements offering computer applications (or simply applications) that require dynamic policy and charging control, such as with respect to a Quality of Service (QoS) level for the media generated by and/or sent from the application; accordingly, the terms "application", "AF", and "AF client" are used interchangeably herein without loss of clarity. Media, as the term is used herein, includes audio/voice, data, video, text, etc., and is also interchangeably referred to herein as "data" without loss of clarity. The applications can include, but are not limited to, Computer Aided Dispatch (CAD), Fireground, Push-to-Talk (PTT, MPTT, etc.), video, etc. Due to the type of media being sent by the AFs 102 and 104 and the timing and purpose for which the media is delivered (e.g., in an emergency situation versus a non-emergency situation, or live voice verses recorded video), these applications may require different QoS levels for sending their respective media to receiving application functions in another device, such as to AF clients 140 and 142 in the UE 130.

Before describing the specifics of transporting media over the LTE EPS, it would be useful to set forth some definitions that will aid in the understanding of the subsequent description. As used herein, the term bearer or bearer resource is defined as a transmission path in a network (such as a radio access network (RAN)) and is used to carry UE data traffic (also termed, herein, as communications or service data flows (SDFs)). An EPS bearer is defined as a bearer that extends between the UE and the PGW and encompasses both a wireless path (UE to eNodeB), as well as a network transport path (eNodeB to PGW). A bearer can be bidirectional, i.e., having both an uplink path from the UE to the application server and a downlink path from the application server to the UE; or a bearer can be unidirectional.

A bearer can be point-to-point (PTP), such as a dedicated bearer or a default bearer and has associated therewith a set of characteristics or attributes including, but not limited to, QoS, a carrier frequency at which data is modulated, a particular bandwidth, bit rate, etc. A default bearer is defined as a non-GBR (guaranteed bit rate) bearer that provides for "best effort" SDF transmission and is allocated to a UE for the duration of its attachment to the LTE system and need not be explicitly requested. A dedicated bearer is defined as any additional bearer that is established for the same UE and is specifically requested by (or on behalf of) a UE and can be either non-GBR or GBR. QoS encompasses such attributes, characteristics or parameters as priority, packet delay budget, packet error loss rate, guaranteed or minimum bit rate, pre-emption capability, bandwidth requirements, etc.

In accordance with the 3GPP TSs, when the AF 102 (for instance) wants to send media (comprising a plurality of packets, wherein a packet is defined as a unit of media) having a certain minimum QoS level or certain minimum QoS requirements, the AF 102 provides certain application level session information to a standard PCRF over a standard Rx control interface (not shown) (wherein "standard" means in conformity with what is described in the 3GPP TSs) in order to obtain a bearer for transporting the packets, wherein the bearer has QoS attributes that meet the QoS requirements of the packets being sent from the AF 102 (in LTE, bearer QoS attributes are characterized by parameters including QoS Class Identifier (QCI), Allocation and Retention Priority (ARP), GBR, and maximum bit rate (MBR)). For example, this application level session information includes, but is not limited to: Internet Protocol (IP) filter information to identify a service data flow to which packets generated by the AF 102 are mapped, media/application bandwidth requirements, or any additional requirements for QoS control.

Upon receiving this application level session information and upon authorizing the QoS requirements for the service data flow (wherein the authorized QoS for the service data flow is referred to herein as a "negotiated QoS level" or "authorized QoS level"), the standard PCRF creates a SDF filter (also referred to in the art as a Traffic Flow Template or "TFT") having the IP filter information used for identifying the particular service data flow for a particular media or communication session for the AF 102. The IP filter information, also termed herein "first identifier information", is also inserted into each packet from the AF 102 to enable the mapping of the packet to the SDF filter that includes the same IP filter information. Such IP filter information includes, but is not limited to, information identifying a source IP address or IPv6 network prefix for the sending AF 102, a destination IP address or IPv6 network prefix for the receiving AF, a source port number, a destination port number, and a protocol ID of the protocol above IP (collectively referred to in the art as the "IP 5 tuple" since there are five parameters), which will be included in the packets and the corresponding SDF filter to facilitate a mapping between the two to identify the appropriate service data flow and to distinguish between service data flows of different applications.

The standard PCRF further includes the SDF filter in an SDF template that corresponds to a bearer having the QoS attributes to meet the authorized QoS requirements of the SDF for the packets. Since there is a one-to-one correspondence between an SDF template and a particular bearer, mapping a given packet to a SDF filter (using the first identifier information or in this case the IP filter information) essentially maps the packet to the correct bearer for transporting the packet over a wireless over-the-air interface between an eNodeB and a UE.

The standard PCRF provides the SDF template (for the bearer) that includes the SDF filter for the AF 102 data packets to a standard PGW, which can perform the binding or association of the SDF template to the proper bearer. The AF 104 similarly sends IP filter information to the standard PCRF to create and send to the PGW a SDF filter to identify the service data flow for its packets to enable the packets to be mapped to a bearer having appropriate characteristics to meet the authorized QoS level for the service data flow for the packets sent from the AF 104.

Once the bearers are established and the mapping information is in place in the PGW 124, the AFs can send their packets over the LTS EPS to be delivered to the receiving AF client, which in this case is an AF client in the UE 130. When sending packets in a network that does not include the infrastructure packet processing function 112 or a infrastructure packet modification function 114, the AF 102 (for instance) generates (obtains) packets and includes the first identifier information in the packet, wherein identifier information is defined as information used in a 3GPP conforming service data flow detection process to map the packet to the correct service data flow and correct bearer for transporting the packet. Moreover, a 3GPP conforming service data flow detection process is defined as a process specified in the 3GPP TSs for service data flow detection such as a service data flow detection process described in section 6.2.2.2 of 3GPP TS 23.203 v. 10.1.0 (Release 10) published September 2010, and previous or future versions of this TS.

In this present example implementation, IP (v4 or v6) is used to transport packets end to end in the network 100. In accordance with IP, an IP header is placed on the packet to facilitate routing in the network. Included in this IP header is the IP filter information (e.g., the IP 5 tuple or some portion of this information), which serves as the first identifier information in the packet. The packet is sent directly to the transport element 116, which comprises a network interface (e.g., a suitable wireline interface and/or router(s)) that transports the AF 102 packets to the PGW 124 over a standard 3GPP SGi reference point between the two elements.

The PGW 124 performs the 3GPP conforming service data flow detection process for the AF 102 packets by reading the IP filter information from the packet header and comparing this information to IP filter information in the SDF filters until a match is found or in other words until it finds the same IP filter information in one of the SDF filters as was read from the packet. Upon such matching, which maps the packets to the appropriate SDF filter, the packets are correspondingly mapped to the SDF template (that includes the SDF filter) and thereby to the correct bearer (which corresponds to the SDF template), which has QoS attributes suitable to accommodate the authorized QoS for the AF 102 packets. The PGW then forwards the AF 102 packets to the SGW 126 over the standard 3GPP S5 interface with an identifier for the bearer, and the packets are further forwarded to the eNodeB 128 over the standard S1u interface for transmitting over-the-air to the UE device 130 over the standard LTE-Uu interface.

In some implementation scenarios and in accordance with the present disclosure, an enterprise may desire to add a packet modification function 114 to its system infrastructure 110 to facilitate security functions such as end-to-end packet encryption, encapsulation, secure access, etc. However a characteristic of the packet modification function 114 is that it modifies the packets coming from the application functions in such a way that it obscures, transposes, scrambles, etc., the first identifier information, which prevents its use by a 3GPP conforming SDF detection process to map packets from the sending AF to the proper SDF filter and hence the proper allocated bearer for the transport of the packets. In other words, once the packets are processed by element 114, the PGW 124 cannot properly read and/or access the first identifier information in order to map the packets to the correct bearer, and the 3GPP TSs and other known art do not address this problem.

In one illustrative implementation, the infrastructure packet modification function 114 is an IP encapsulation function which means that at a minimum the packet is encapsulated meaning that an outer IP header is added to the packet such that information below or internal to this header cannot be read unless the outer header is stripped or removed from the packet. For example, the infrastructure packet modification function 114 is a virtual private network (VPN) function that encrypts the packet payload and IP header added by the AF and encapsulates the packet using an Encapsulating Security Payload (ESP) header. Thus, without further aspects of the teachings herein, when the packet reaches the PGW 124, this standard PGW is unable to strip the outer ESP header and decrypt the packet contents in order to obtain the first identifier information (e.g., the IP 5 tuple information) that it needs to perform the 3GPP conforming SDF detection process.

Therefore, further in accordance with the teachings herein, a novel infrastructure packet processing function 112 is also added to the system infrastructure 110 in the path between the AF and the standard PGW 124, and, more particularly, before the packet modification function 114. The packet processing function adds second identifier information to each packet from the AFs 102, 104 that can be used by the PGW 124, instead of the first identifier information, in the 3GPP conforming SDF detection process to map the packets to the correct service data flow and to the correct bearer for sending the packets to the receiving application function. Both the packet processing function 112, the packet modification function 114, and the transport equipment 116 or portions of such functionality can be included in the same infrastructure device (e.g., such as in the same application server) or distributed across multiple infrastructure devices.

To facilitate communication of the second identifier information and related information to implement the disclosed embodiments, the standard Rx interface between the AF and the PCRF cannot be used. Therefore, in accordance with embodiments of the present disclosure, some novel control interfaces are added, e.g., control interfaces C1 between the packet processing function 112 and the policy definition function 122 and C2 between the packet processing function 112 and the packet modification function 114. In addition, a standard PCRF cannot support the generation and distribution of the second identifier information. Therefore, in accordance with the present disclosure and in an illustrative LTE implementation, the policy definition function comprises or resides in an "enhanced" PCRF, wherein "enhanced" means that the PCRF still conforms with the 3GPP TSs, but it also performs functionality above and beyond what is described or disclosed in the 3GPP TSs.

More particularly, first described will be an embodiment of the present teachings without the use of the infrastructure packet processing API. The packet processing function allows each agency that it serves to choose a prioritization model that suits their needs (e.g., application, device, incident, role, etc.) and allows agency administrators to add, change, or delete information related to treatment of packets from each application from which the function 112 receives. For instance, the administrator informs the packet processing function 112 of the L3/L4 (of the Open Systems Interconnect networking model) information for the application (e.g., the first identifier information or IP filter information) and the QoS needs for each application in the application server and/or UE operating on the enterprise network.

Alternatively or in addition thereto, some or all of the infrastructure AFs can include an infrastructure packet processing API 106 that allows the application to provide, over a novel C3 control interface, the first identifier information and QoS needs (e.g., in the form of a request for a desired QoS) for the application (and perhaps other applications) and/or to dynamically change the QoS requirements for the application and to change priority of access network resources. The AF can also be configured to receive access network event notifications (e.g., congestion notifications, bearer management messages, location updates, etc.) over the C3 interface.

The packet processing function 112 provides the first identifier information and QoS needs to the enhanced PCRF 122 over the C1 control interface to facilitate service data flow mapping in accordance with the present teachings. The enhanced PCRF uses the first identifier information (or at least some of it) to generate, allocate, and/or determine second identifier information for one or more applications. As used herein, second identifier information is defined as information that is used (instead of the first identifier information) in a 3GPP conforming SDF detection process to map packets from an application to the correct service data flow and the correct bearer having adequate QoS attributes for transporting the packets.

In one illustrative implementation, the second identifier information includes a Type of Service (ToS) value, which is defined as a value for inserting into a ToS field in an IP header, and in a more particular implementation in a six bit Differentiated Services Code Point (DSCP) field within the ToS field, wherein the ToS value is also referred to herein as a DSCP value. The second identifier information may also include other IP information such as, for example, a destination IP address, but could just simply include the ToS value. The enhanced PCRF 122 provides at least part of the second identifier information (in this case at least the ToS/DSCP value) to the packet processing function 112 over the C1 control interface, for example in response to a request for a desired QoS level for a given service data flow. The enhanced PCRF also creates a corresponding SDF filter for the packets coming from that particular application and includes second identifier information (e.g., the ToS/DSCP value, and any additional IP filter information) in the SDF filter to enable service data flow detection, in accordance with the present teachings. The enhanced PCRF includes the SDF filter with the second identifier information in an SDF template associated with a bearer having sufficient QoS attributes to meet the QoS needs for those packets. The enhanced PCRF 122 sends the SDF template to the PGW 124.

Based on the use of the second identifier information in accordance with the current teachings, the new user plane data flow in the downlink is as follows. The AF (e.g., AF 102) generates a packet as it normally does, wherein the packet still includes the first identifier information (e.g., the IP 5 tuple or portions thereof) in the outer IP header. However, instead of sending the packet directly to the transport equipment 116, the packet is provided to the packet processing function 112. The packet processing function includes or adds the second identifier information to the packet. In this illustrative implementation, the packet processing function 112 adds or inserts the DSCP value into the DSCP field of the IP header that was added by the AF, and sends the packet to the packet modification function 114.

The packet modification function 114, in this implementation, encapsulates the packet, thereby modifying or altering the first identifier information. However, in accordance with the present teachings, the packet modification function 114 positions the second identifier information such that it is obtainable by the PGW 124. For instance, the packet modification function 114 promotes or copies or inserts the second identifier information into the outer IP header (e.g., the ESP header) that it places onto the packet. In this case, it includes the DSCP value in the DSCP field of the outer IP header and may also include the destination address for the UE 130. The packet is then transported using transport equipment 116 to the PGW 124.

In one implementation, the packet modification function 114 is configured to promote the second identifier information to the outer IP header of all IP packets, for example, where all packets are modified or altered by the packet modification function 114. However, in some system implementations, some packets are sent in the clear (i.e., without being altered by the packet modification function 114). In such a case, the packet modification function 114 needs to know which packets for which it should promote the second identifier information. The C2 control interface is used for this purpose. Using the C2 interface, the packet processing function 112 identifies to the packet modification function 114 those packets (or the AF sending those packets) for which it needs to (or does not need to) handle the second identifier information.

Upon receiving the packet from the packet modification function, the PGW 124 obtains the second identifier information from the outer IP packet and uses the second identifier information instead of the first identifier information in the 3GPP conforming service data flow detection process to map the packet to the correct service data flow for that particular application using its corresponding SDF filter and to, thereby, map the packet to the correct SDF template and associated bearer to transport the packet to an AF client in the UE 130 via the SGW 126 and eNodeB 128 and respective interfaces, S5, S1u, LTE-Uu. More particularly, The PGW 124 performs the 3GPP conforming service data flow detection process for the AF packets by reading the ToS value and other IP information (if needed) from the packet header and comparing this information to ToS and other IP information in the SDF filters until a match is found or in other words until it finds the same ToS value and IP information in one of the SDF filters as was read from the packet.

A similar process is performed with the AF clients 140 or 144 as the sending AF and the AF 102 or 104 as the receiving AF. Accordingly, the UE 130 includes the UE packet modification function 134 (for example, but not necessarily, incorporated into the UE operating system 136) and a UE packet processing function 138 in the path between the UE AF clients and the packet modification function 134 to intercept and process the packets to enable implementation of the described embodiments. In this case, either the infrastructure or the UE device 130 itself provides to the enhanced PCRF 122 the L3/L4 information for the UE applications (e.g., the first identifier information or IP filter information) and the QoS needs for each UE application.

Where the infrastructure provides such first identifier information and requested QoS level, it is done via network operator programming of the packet processing function 112, which provides the first identifier information and QoS requirements to the enhanced PCRF via the C1 control interface. Where the UE provides the first identifier and QoS information, two different ways can be used either alone or in some combination. First, a network operator programs the UE packet processing function 138 with the first identifier and QoS information for one or more of the UE AF clients, which information the UE packet processing function 138 sends over the C4 control interface to a control signal routing function (e.g., the infrastructure packet processing function 112), which further forwards the first identifier and QoS information over a different control interface (e.g., interface C1) to the enhanced PCRF 122. In a second implementation, at least one of the client AF clients contains a UE packet processing API (e.g., API 144) used to dynamically send the first identifier information and request/modify QoS requirements for the application (and perhaps other UE applications) to the UE packet processing function 138 for providing to the enhanced PCRF 122.

Upon receiving the first identifier and QoS information for the UE 130, the enhanced PCRF uses the first identifier information (or at least some of it) to generate, allocate, and/or determine second identifier information (e.g., the ToS/DSCP value, IP destination address, etc.) for one or more applications. The enhanced PCRF 122 provides at least part of the second identifier information (in this case at least the ToS/DSCP value) to the packet processing function 138 over the C1 and C4 control interfaces, for example in response to a request for a desired QoS level for a given service data flow. The enhanced PCRF also creates a corresponding SDF filter for the packets coming from that particular application and includes the second identifier information (e.g., the ToS/DSCP value, and any additional IP filter information) in the SDF filter to enable service data flow detection, in accordance with the present teachings. The enhanced PCRF 122 includes the SDF filter with the second identifier information in an SDF template associated with a bearer having sufficient QoS attributes to meet the QoS needs for those packets. The enhanced PCRF 122 sends the SDF template to the UE 130 (either by sending it to the PGW, which signals the SDF template to the UE or by providing it to the packet processing functions 112, which sends the SDF template to the UE over the C1 and C4 control interfaces), and the UE provides the SDF template to its LTE chipset 132.

Based on the use of the second identifier information in accordance with the current teachings, the new user plane data flow in the uplink is as follows. The AF client (e.g., AF 144) generates a packet as it normally does, wherein the packet still includes the first identifier information (e.g., the IP 5 tuple or portions thereof) in the outer IP header. However, instead of sending the packet directly to the UE LTE chipset 132, the packet is provided to the packet processing function 138. The packet processing function includes or adds the second identifier information to the packet. In this illustrative implementation, the packet processing function 112 adds or inserts the DSCP value into the DSCP field of the IP header that was added by the AF, and sends the packet to the packet modification function 134.

The packet modification function 134, in this implementation, encapsulates the packet, thereby modifying or altering the first identifier information. However, in accordance with the present teachings, the packet modification function 134 positions the second identifier information such that it is obtainable by the UE LTE chipset 132. For instance, the packet modification function 134 performs VPN functions and promotes or copies or inserts the DSCP value in the DSCP field of the outer ESP header that it places onto the packet. The packet is then sent to the UE LTE chipset 132, which obtains the second identifier information from the outer IP packet and uses the second identifier information instead of the first identifier information in the 3GPP conforming service data flow detection process to map the packet to the correct service data flow for that particular application using its corresponding SDF filter and to, thereby, map the packet to the correct SDF template and associated bearer to transport the packet to an AF in the infrastructure via the eNodeB 128, SGW 126, and PGW 124 and their respective interfaces, LTE-Uu, S1u, S5, and SGi. More particularly, The UE LTE chipset 132 performs the 3GPP conforming service data flow detection process for the AF packets by reading the ToS value and other IP information (if needed) from the packet header and comparing this information to ToS and other IP information in the SDF filters until a match is found or in other words until it finds the same ToS value and IP information in one of the SDF filters as was read from the packet.

Based upon the above-described system functionality in accordance with the teachings herein, many specific implementation scenarios can be practiced. FIGS. 2 and 3 provide one example implementation scenario. In this case implementation scenario: a Public Safety Interoperability Gateway (PSIG) server performs the functionality of the infrastructure packet processing function 112; a MVPN server performs the functionality of the infrastructure packet modification function 114; an edge router performs the functionality of the transport element 116; a QoB (QoS broker) performs the functionality of the enhanced PCRF 122; a PSIG client performs the functionality of the UE packet processing function 138; and a MVPN client performs the functionality of the UE packet modification function 134. FIG. 2 illustrates user plane data flow (and some control signaling) in the downlink direction from infrastructure applications 202 to UE applications 204. FIG. 3 illustrates user plane data flow (and some control signaling) in the uplink direction from UE applications 304 to infrastructure applications 302.

Figure 2:
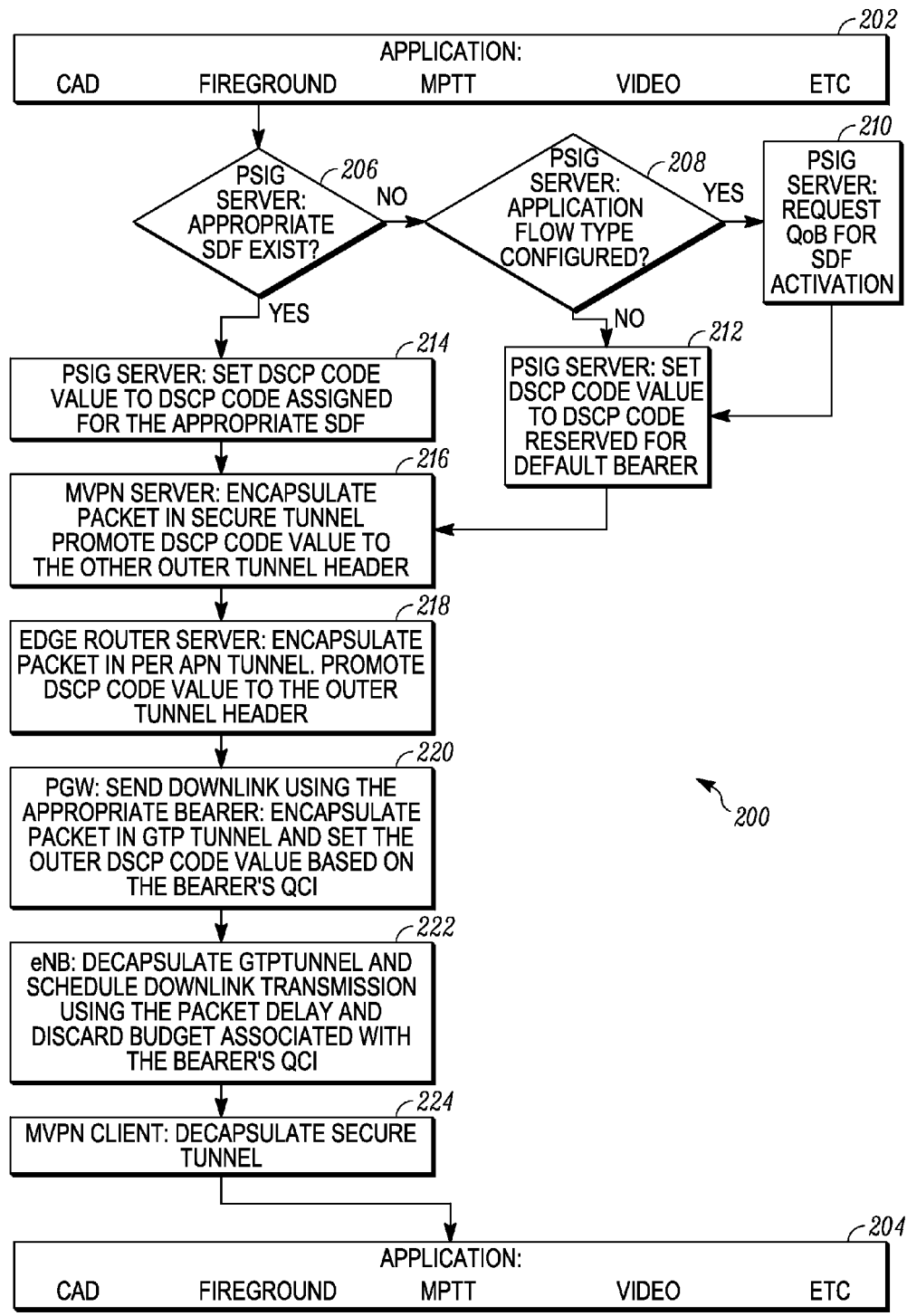
FIG. 2 is a flow diagram illustrating a method for service data flow detection for downlink packet flow from an application function in an application server to an application function client in a user equipment, in accordance with some embodiments.

In accordance with process flow 200 of FIG. 2, the PSIG intercepts (206) all downlink packets destined for UE registered with the PSIG. If there is no associated application flow (service data flow) set up for the application, the PSIG checks (208) if there is a matching application flow type defined in a PSIG Application Flow Identification table that is, for instance, pre-configured into the PSIG. If there is a matching application flow type defined, the PSIG requests (210) the QoB to set up the application flow, in accordance with standard LTE activation procedures as described in the 3GPP TSs.

The QoB assigns a DSCP value (also referred to herein as a DSP code) used to identify the service data flow.

For all packets associated with that specific application flow, the PSIG marks (214) the ToS field with the assigned DSCP value assigned to the service data flow. Until the PSIG receives the assigned DSCP for associated Service Data Flow, the PSIG marks (212) the downlink packet with a DSCP reserved for its (LTE) default bearer. Moreover, if there is no matching application flow type defined, the PSIG marks the downlink packet with the DSCP reserved for its (LTE) default bearer.

If MVPN is used and the downlink packet is encapsulated (216) within a secure tunnel, the MVPN server is responsible for promoting the DSCP value to the outer tunnel It should be noted that if the MVPN server has packet combining capability (ability to combine multiple smaller IP packets into larger IP packet), the MVPN server can only combine packets with the same DSCP values.

The edge router in the agency space tunnels (218) the downlink packet in per APN (access point network) tunnel to the PGW. The PGW decapsulates the per APN tunnel, and uses the DSCP value in the outer (MVPN secure) tunnel to identify (220) the (LTE) bearer to which to send the downlink packet. The PGW encapsulates (220) the packet in a GTP-U tunnel and sets the outer DSCP value based on the (LTE) bearer QCI. Application flows are identified at the PGW using the destination IP address & DSCP combination, and are mapped to the proper GTP tunnel to the eNB (eNodeB). If overlapping private UE IP addresses across agencies is supported, the IP/DSCP combination will only be unique for a given agency. UE's APN information is used, in addition to the destination IP address & DSCP combination, to identify a given flow across the agencies that are utilizing a shared PGW. The eNB decapsulates (222) the GTP-U tunnel and schedules downlink transmission based on the packet delay and discard budget associated with the (LTE) bearer QCI. The MVPN client decapsulates (224) the secure tunnel and delivers the packets to the application layer 204.

Figure 3:
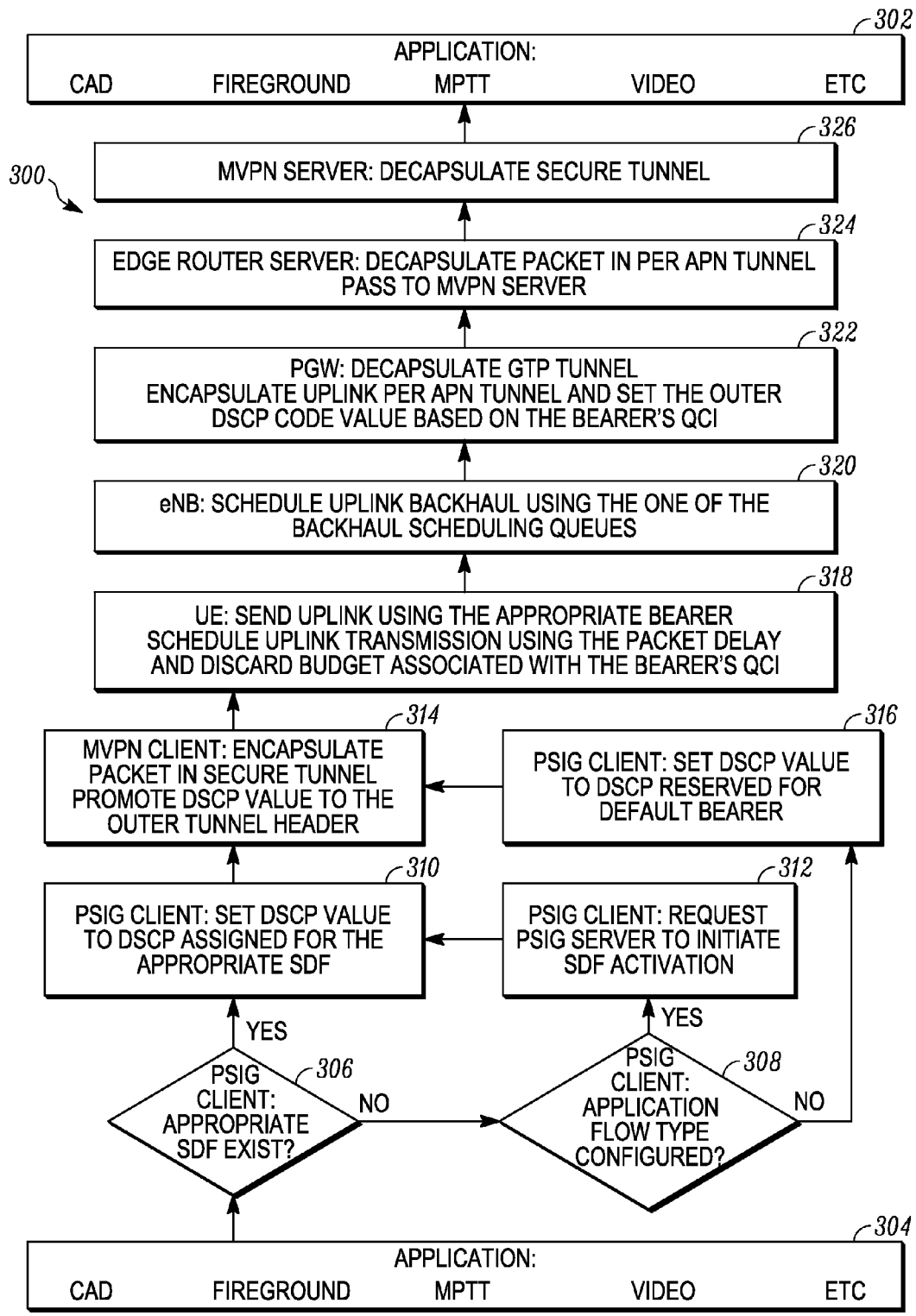
FIG. 3 is a flow diagram illustrating a method for service data flow detection for uplink packet flow from an application function client in a user equipment to an application function in an application server, in accordance with some embodiments.

In accordance with process flow 300 of FIG. 3, the PSIG Client intercepts all uplink packets. If there is no associated application flow (service data flow) set up for the application, the PSIG Client checks if there is a matching application flow type defined in a PSIG Application Flow Identification table provisioned into the UE. If there is a matching application flow type defined, the PSIG Client requests (312) the PSIG Server to set up the application flow using standard LTE procedures described in the 3GPP TSs.

The QoB assigns a DSCP value used to identify the Service Data Flow. For all packets associated with that specific application flow, the PSIG Client marks (310) the ToS field with the assigned DSCP value assigned to the Service Data Flow. Until the PSIG Client receives the assigned DSCP value for an associated service data flow, the PSIG Client marks (316) the uplink packet with the DSCP reserved for (LTE) its default bearer. Moreover, if there is no matching application flow type defined, the PSIG Client marks (316) the uplink packet with the DSCP reserved for the (LTE) default bearer.

If MVPN is used and the uplink packet is encapsulated within a secure tunnel, the MVPN client is responsible for promoting (314) the DSCP value to the outer tunnel It should be noted that if the MVPN client has packet combining capability (ability to combine multiple smaller IP packets into larger IP packet), the MVPN client can only combine packets with the same DSCP values.

The UE uses the DSCP value in the outer tunnel to identify the (LTE) bearer to which to send (318) the uplink packet. The UE schedules uplink transmission using the packet delay and discard budget associated with the bearer's QCI. The eNB encapsulates the uplink packet in GTP-U tunnel and schedules (320) backhaul uplink transmission using one of the backhaul scheduling queues. The PGW decapsulates (322) the GTP-U tunnel and sends the packets to the appropriate AF using the per APN tunnel The PGW sets the outer DSCP value based on the (LTE) bearer QCI. The edge router decapsulates (324) the per APN tunnel and passes the packets to the MVPN server. The MVPN server decapsulates (326) the secure tunnel and delivers the packets to the application layer 302.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for service data flow detection described herein. The non-processor circuits may include, but are not limited to, a radio receiver, a radio transmitter, signal drivers, clock circuits, power source circuits, and user input devices. As such, these functions may be interpreted as steps of a method to perform the service data flow detection described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system that supports service data flow detection when using a packet modification function, the system comprising:
   a system infrastructure for interfacing between an application function and an Evolved Packet System (EPS) and comprising:
   one or more system infrastructure nodes that are above the EPS and that serve as an encryption endpoint, wherein the one or more system infrastructure nodes are configured to implement:
     a first packet processing function that receives a packet generated by a sending application function, wherein the packet is destined for a receiving application function, wherein the packet includes first identifier information associated with a service data flow, and wherein the first packet processing function adds second identifier information to a header of the packet;
     a packet modification function that receives the packet from the first packet processing function, repositions the second identifier information in the packet and, subsequent to repositioning the second identifier information, encrypts the packet in a way that prevents use of the first identifier information by a 3$^{rd}$ Generation Partnership Project (3GPP) conforming service data flow detection process to map the packet to the service data flow for the sending application function, wherein the repositioning of the second identifier information in the packet enables a packet gateway of an evolved packet system to use the second identifier information instead of the first identifier information in the 3GPP conforming service data flow detection process to map the packet to the service data flow and to a bearer used to send the packet to the receiving application function; and wherein the one or more system infrastructure nodes are configured to convey the encrypted packet, comprising the re-positioned second identifier information, to the EPS.

2. The system of claim 1 further comprising a network element of the Evolved Packet System that is configured to perform a policy definition function that provides the second identifier information to the first packet processing function.

3. The system of claim 2, wherein the network element comprises an enhanced Policy Control and Charging Rules Function of a Long Term Evolution Evolved Packet Core that performs the policy definition function.

4. The system of claim 2, further comprising a control interface between the one or more system infrastructure nodes and the network element performing the policy definition function for transporting the second identifier information.

5. The system of claim 1, wherein the second identifier information comprises a value added into an Internet Protocol (IP) Type of Service (ToS) field in the packet.

6. The system of claim 5, wherein the value is added into a Differentiated Services Code Point field in the IP ToS field.

7. The system of claim 5, wherein the value is set to match a corresponding value included in a service data flow (SDF) filter that identifies the service data flow, wherein the SDF filter is included in a SDF template provided to the packet routing function, wherein the SDF template corresponds to a bearer having Quality of Service (QoS) attributes that support an authorized QoS level for the service data flow.

8. The system of claim 1, wherein the packet modification function comprises an Internet Protocol encapsulation function.

9. The system of claim 1, wherein conveying the encrypted packet comprising to the evolved packet system comprises conveying the encrypted packet to a Packet Data Network Gateway in a Long Term Evolution Evolved Packet Core.

10. The system of claim 1 further comprising a packet processing application programming interface, between the sending application function and the first packet processing function, which requests a Quality of Service level for the service data flow.

11. The system of claim 1, wherein the packet modification function comprises a virtual private network function that repositions the second identifier information in the packet and encrypts the packet.

12. A method for service data flow detection, the method comprising:

in an infrastructure system interposed between an application system and an Evolved Packet System (EPS), wherein the infrastructure system is above the EPS and serves as an encryption endpoint:
a first packet processing function performing:
receiving a packet that is generated by a sending application function, wherein the packet is destined for a receiving application function, wherein the packet includes first identifier information that is associated with a service data flow; and
adding second identifier information to a header of the packet;
a packet modification function performing:
receiving the packet from the first packet processing function;
re-positioning the second identifier information in the packet so that a packet gateway of an evolved packet system can use the second identifier information instead of the first identifier information in the 3GPP conforming service data flow detection process to map the packet to the first service data flow and to a bearer used to send the packet to the receiving application function;
subsequent to re-positioning the second identifier information, encrypting the packet in a way that prevents use of the first identifier information by a 3$^{rd}$ Generation Partnership Project (3GPP) conforming service data flow detection process to map the packet to the service data flow for the sending application function; and
conveying the encrypted packet, comprising the re-positioned second identifier information, to the EPS.

13. The method of claim 12 further comprising the first packet processing function receiving the second identifier information from a policy definition function.

14. The method of claim 13, wherein the second identifier information is received in response to a request for a desired Quality of Service (QoS) level for the service data flow.

15. The method of claim 12, wherein the second identifier information comprises a Differentiated Services Code Point (DSCP) value, the method further comprising the first packet processing function adding the DSCP value into an Internet Protocol Type of Service field in the packet.

16. The method of claim 15 further comprising the policy definition function sending to the packet gateway a service data flow (SDF) template that corresponds to a bearer having QoS attributes that support a QoS level for the service data flow, wherein the SDF template includes a SDF filter having the same DSCP value as the packet for mapping the packet to the bearer having the QoS attributes the support the QoS level for the service data flow.

17. The method of claim 12 wherein encrypting comprises performing an Internet Protocol (IP) encapsulation function on the packet and wherein re-positioning comprises adding the second identifier information to an outer IP header of the packet to enable the use of the second identifier information by the packet gateway.

18. The method of claim 12, wherein the packet modification function comprises a virtual private network function that repositions the second identifier information in the packet and encrypts the packet.

19. A method that supports service data flow detection when using a packet modification function, the method comprising:

in an infrastructure system interposed between an application system and an Evolved Packet System (EPS), wherein the infrastructure system is above the EPS and serves as an encryption endpoint:
a first packet processing function performing:
receiving a packet generated by a sending application function, wherein the packet is destined for a receiving application function, wherein the packet includes first identifier information, wherein the first packet processing function adds second identifier information to the packet;

a packet modification function performing:
  receiving the packet from the first packet processing function;
  altering the packet in a way that prevents use of the first identifier information by a $3^{rd}$ Generation Partnership Project (3GPP) conforming service data flow detection process to map the packet to a service data flow for the sending application function;
  providing the packet to a packet routing function, wherein the second identifier information is positioned in the packet to enable the packet routing function to use the second identifier information instead of the first identifier information in the 3GPP conforming service data flow detection process to map the packet to the service data flow and to a bearer used to send the packet to the receiving application function; and
wherein the first identifier information is included in a first Internet Protocol (IP) header of the packet and the second identifier information comprises a value added into a second IP header of the packet that encapsulates the first IP header, wherein the value is set to match a corresponding value included in a service data flow (SDF) filter that identifies the service data flow, wherein the SDF filter is provided to the packet routing function, and wherein the SDF filter corresponds to a bearer having Quality of Service (QoS) attributes that support an authorized QoS level for the service data flow.

* * * * *

UNITED STATES PATENT AND TRADEMARK OFFICE
CERTIFICATE OF CORRECTION

PATENT NO. : 8,982,888 B2  
APPLICATION NO. : 12/906226  
DATED : March 17, 2015  
INVENTOR(S) : Scott J. Pappas et al.

Page 1 of 1

It is certified that error appears in the above-identified patent and that said Letters Patent is hereby corrected as shown below:

IN THE SPECIFICATION:

In Column 4, Line 5, delete "SGW128)" and insert -- SGW126) --, therefor.

In Column 12, Line 14, delete "tunnel It" and insert -- tunnel. It --, therefor.

In Column 12, Line 60, delete "tunnel It" and insert -- tunnel. It --, therefor.

In Column 13, Line 6, delete "tunnel The" and insert -- tunnel. The --, therefor.

Signed and Sealed this  
Twelfth Day of July, 2016

Michelle K. Lee  
*Director of the United States Patent and Trademark Office*